Sept. 7, 1937.   L. F. CARTER   2,091,964
AIR BORNE GYRO MAGNETIC COMPASS
Filed Jan. 5, 1935   3 Sheets-Sheet 1
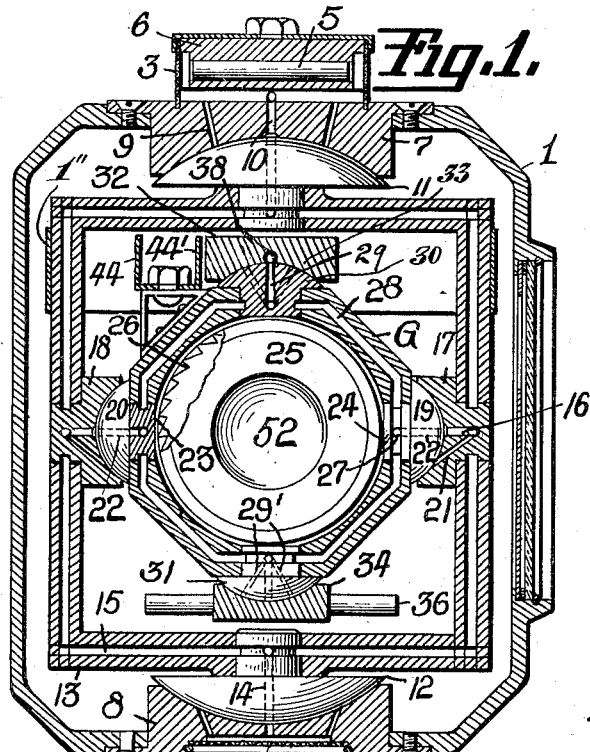
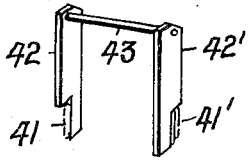
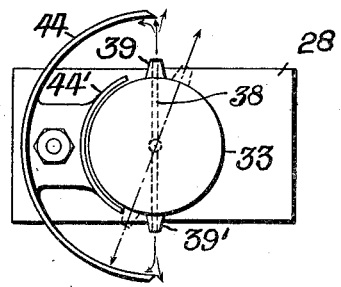
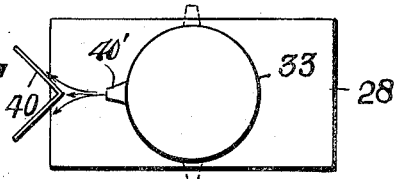
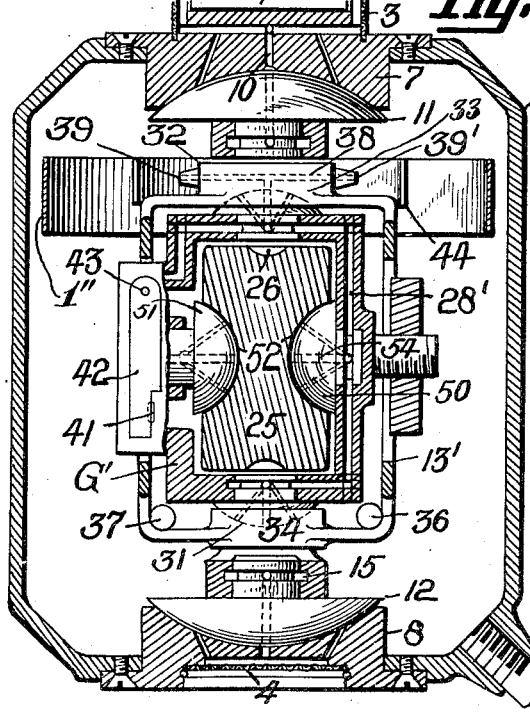
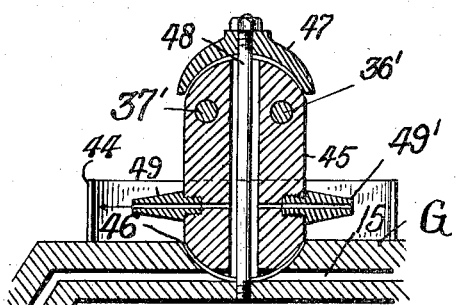
INVENTOR
LESLIE F. CARTER
BY Herbert H. Thompson
HIS ATTORNEY.

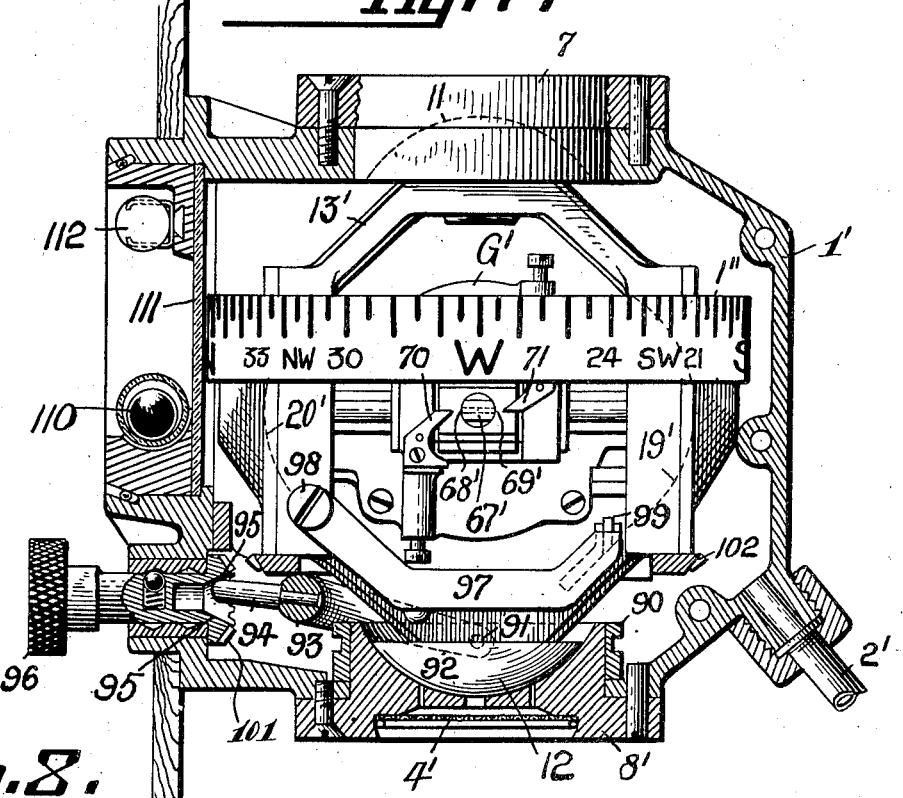

Sept. 7, 1937.　　　L. F. CARTER　　　2,091,964
AIR BORNE GYRO MAGNETIC COMPASS
Filed Jan. 5, 1935　　　3 Sheets-Sheet 3
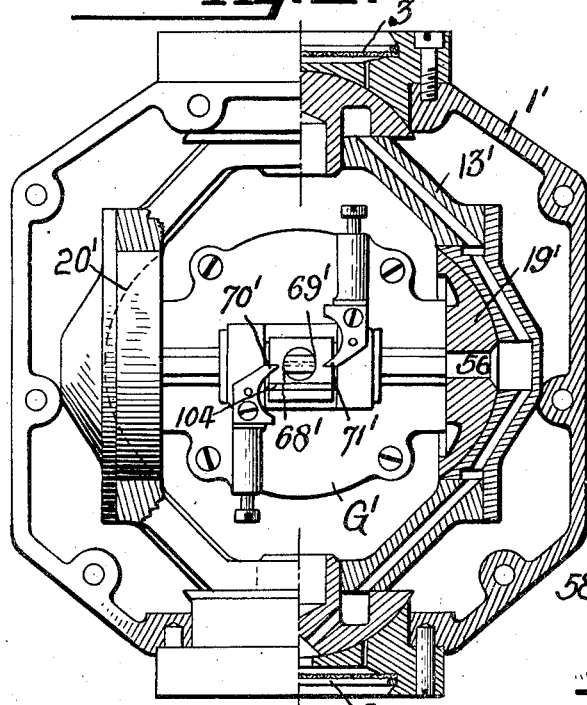
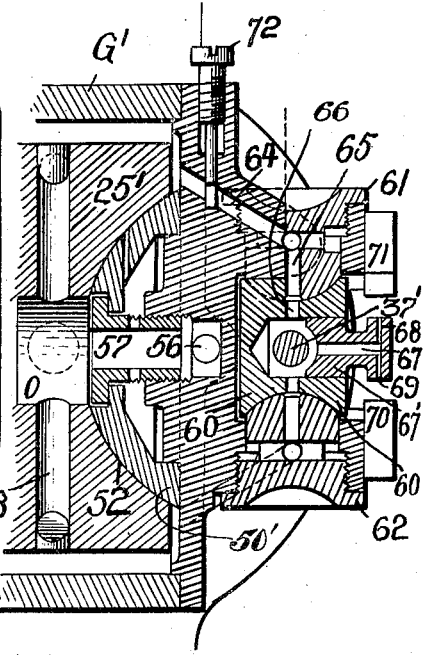
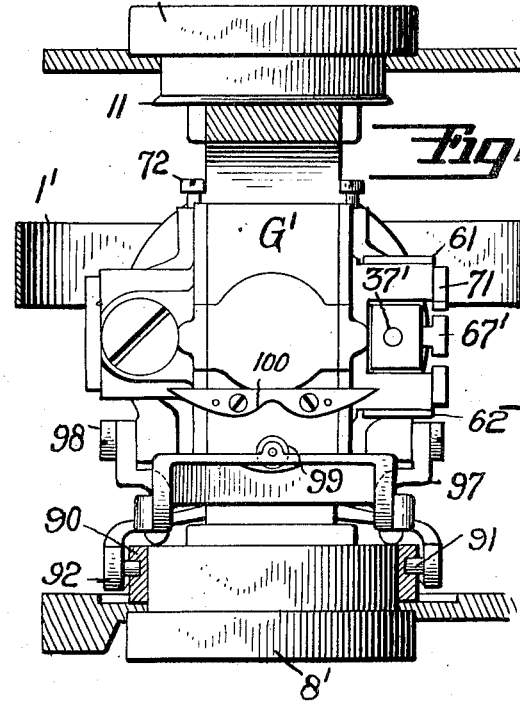
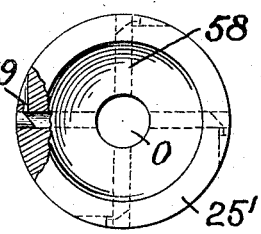
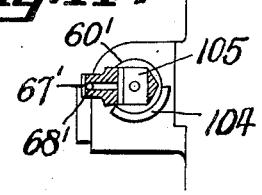
INVENTOR
Leslie F. Carter
BY Herbert H. Thompson
HIS ATTORNEY.

Patented Sept. 7, 1937

2,091,964

UNITED STATES PATENT OFFICE 2,091,964

AIR BORNE GYRO-MAGNETIC COMPASS

Leslie F. Carter, Leonia, N. J., assignor to Sperry Gyroscope Company, Inc., Brooklyn, N. Y., a corporation of New York Application January 5, 1935, Serial No. 491

22 Claims. (Cl. 33—222)

This invention relates to improvements in a combined gyroscopic and magnetic compass in which the directional advantages of the latter are combined with the relative fixity of the former to produce a new type of indicating instrument. While such instruments have been proposed before, they have not as yet met with much success due to a variety of causes, to overcome which is the object of this invention.

In my invention, all the bearings of both the gyroscopic and magnetic element are of the air borne or air floated type, whereby the troubles with the magnetizable steel ball bearings are avoided and greater freedom secured about all axes. In addition, I have provided an air force impressor for exerting a torque on the gyroscope upon relative displacement of the magnetic needle and gyroscope in azimuth, which has no appreciable reaction on the magnetic element, so that the latter is free to maintain its position in the magnetic meridian. A gravitationally responsive air erection device is also employed, whereby the pivot of the magnetic element, which is mounted on the gyroscope, is stabilized in one plane at least.

A further object of my invention is to improve the construction of magnetic compasses by providing a frictionless air borne bearing for supporting the same about a vertical axis.

Other objects of the invention become apparent from the following description.

Referring to the drawings illustrating several forms my invention may assume,

Fig. 1 is a vertical central section in the north-south plane of my gyro-magnetic compass.

Fig. 2 is a vertical central section of the same at right angles to Fig. 1.

Fig. 3 is a detail showing the gravitationally responsive air erecting means employed.

Fig. 4 is a detail, in plan, of the torque applying means brought into action by relative displacement of the magnetic and gyro elements.

Fig. 5 is a similar view of a modification of such torque means.

Fig. 6 is a vertical section of another modified form of mounting for the magnetic element and torque device.

Fig. 7 is a side elevation of a modified form of gyro-magnetic compass, the outer casing being shown in section.

Fig. 8 is a view of the rotatable element of Fig. 7, viewed from the east end, the card having been removed.

Fig. 9 is a horizontal section, on a larger scale, through the west end of the instrument.

Fig. 10 is a similar vertical section through the east end of the instrument.

Fig. 11 is a west elevation, partly in section, of the instrument, the section of the casing, however, being tilted at an angle to Fig. 7, and also showing a simplified form without a caging device.

Fig. 12 is a side elevation, partly in section, of the instrument shown in Fig. 7.

Fig. 13 is a detail of the rotor, showing the reaction drive.

Fig. 14 is a detail of the air erecting device.

According to my invention, I prefer to employ air or other gas under pressure for not only spinning the rotor, but for supplying the necessary controlling torques on the gyroscope and as a lubricant or floating support for all bearings of the gyroscope and magnetic compass. Either super-atmospheric or sub-atmospheric pressure may obviously be employed, I having illustrated the latter in the drawings. To this end the instrument as a whole is enclosed in an outer casing 1, which is made air-tight except for certain inlets, and from which air is continuously withdrawn through the pipe 2 by a suitable pump (not shown). Inlets for air, having screened openings 3 and 4, are shown in Figs. 1 and 2 at the top and bottom of the casing. Magnetic compensating bars 5 may be mounted in the cap 6 if desired.

In the top and bottom of the casing are provided concave bearing plates 7 and 8, through which one or more holes 9 and 10 are bored to admit incoming air between the concave surfaces of the caps and the convex surfaces of the upper and lower buttons 11 and 12 on the vertical ring 13, to which compass card 1'' is secured. Very slight clearance is provided between the button and caps to permit sufficient continuous air flow to float the vertical ring on a vertical axis on a film of moving air. The centers of curvature of the buttons are spaced so that freedom about the vertical axis only is provided. Each button is also drilled with a small hole 14 so that some of the air passes through the same and into channels 15 in the vertical ring. This air passes through bores 16 in smaller cups 17 and 18 which act to support the rotor casing for oscillation about the horizontal axis. The rotor casing accordingly is provided with cooperating buttons 19 and 20, some of the air escaping between the surfaces of said cups and buttons to float the casing. It may be noted that an extra channel or channels 21 is provided, leading below the axis of oscillation so that more air is supplied where the weight of the gyro rests.

Some of the air also passes on through hole 22 in each of said buttons 19 and 20 and thence some of the air is directed through nozzles 23 and 24 onto the periphery of the gyro rotor 25, in which buckets or blades 26 may be cut. A portion of said air, however, passes through lateral bores 27 into interior channels 28' in the gyro casing 28, whence it passes through a plurality of bores 29, 29' in upper and lower buttons 30 and 31 secured in the gyro casing. Pivotally mounted on said buttons is an outer ring or frame 32, which is formed with cups 33 and 34 top and bottom, providing air bearings in conjunction with said buttons between said frame and the gyro casing. Said frame constitutes the magnetic element and carries one or more magnets 36, 37. The magnets are therefore stabilized against oscillation about a N—S axis by the gyroscope, but are free to turn in azimuth with respect to the gyroscope on air bearings 30—33 and 31—34.

The gyroscope is slowly coerced in azimuth upon relative displacement between the magnetic element and the gyroscope to restore synchronism. The rotor bearing frame G therefore constitutes a follow-up, stabilized support for the magnetic element 32. This may be accomplished by directing some of the air passing through upper central channel 29 through a lateral channel 38 in cap 32 and through a pair of oppositely directed nozzles 39, 39' against a semicircular ring or other member 44 on the gyro casing. Said nozzles are preferably placed E—W. It will be readily apparent that as long as the two knife edges of ring 44 are similarly disposed with respect to the air stream from the nozzles, no torque will be exerted about the horizontal axis, but upon relative displacement such a torque will be exerted in one direction or the other due to the unbalanced reaction from the one nozzle or the other, and also the unbalanced pressure exerted by the air on the ring. The former torque will be transmitted from the ring 33 to the gyro casing through the vertical pivots between the cups 32 and 34 and the buttons 30 and 31. A shorter annular piece 44' serves as a stop in conjunction with nozzles 39, 39' to limit the relative movements of the magnetic element.

A modified air torque system is shown in Fig. 5. The baffle plate 40 in this instance is shown as V-shaped, with the apex of the angle normally bisecting the air stream from a single nozzle 40'. It will be readily apparent that upon relative movement in azimuth between the gyroscope and nozzle on which the magnetic element is mounted, a torque will be exerted about the horizontal axis 17—18 in such a direction as to cause the gyroscope to slowly follow the magnetic element. A torque is also exerted thereby about the vertical axis, but this cannot produce tilt because of the air erecting torques exerted by jets 41 and 41', which are made much stronger than the jet 40'. In case the jet 40' leaves the plate 40 and turns to either of the dotted line positions in Fig. 5, a pure torque about the horizontal is exerted.

I also provide a means for preventing the gyroscope from assuming a tilt about its horizontal axis. This may comprise laterally directed opposing ports 41 and 41' which are normally partially covered by small pendulous blades 42, 42' hanging from pivot pin 43. Upon inclination of the gyroscope casing, the ports are unequally covered, causing a torque about the vertical axis to cause the gyroscope to remain level.

A very simple mounting for the magnetic element is shown in Fig. 6. In this case the ring 32 is omitted and the magnetic element comprises merely a short piece of thick tubing 45 with hemispherical ends mounted on top of the gyro casing G. The lower end of said tubing has an air bearing support in the hollowed out top of the casing at 46. The upper end has a similar guide bearing in a cap 47 secured to a stem 48 threaded in the casing. The air passes from the channel 15 in the casing G out between the surface 46 in the lower end of tube 45 to supply the lower air bearing, and similarly between the cap 47 and the upper hemispherical surface of tube 45 to provide the upper air bearing. A portion of the air also escapes laterally through the nozzles 49, 49' engaging the semicircular or baffle plate 44, as in Fig. 1. The magnet bars 36' and 37' are shown as mounted through lateral apertures in the tubing 45.

A portion of the air from the channels 28 within the casing also flows through small bores 54 within inwardly projecting buttons 50 and 51 secured to the inner face of said casing. The opposite faces of the rotor 25 are cut out to form complementary concave surfaces closely fitting the said buttons, so that when air is supplied to the system the outward escape of the air will float the rotor on an air film on both sides, thereby providing an effective bearing for spinning.

In the remaining figures of the drawings, which disclose the preferred forms of the invention, the air bearings are retained, but the mounting of the magnetic element and the method of securing torques therefrom are somewhat different. The main gyroscopic element, as before, comprises a vertical ring 13' mounted in air bearings top and bottom within the casing 1', the element being shown removed from the casing in Fig. 8. The gyro casing G' is, as before, supported for oscillation about a horizontal axis and air bearings provided by the buttons 19' and 20', and the rotor, as before, is journalled within said casing upon air bearings provided by inwardly projecting buttons 50', 51' cooperating with concave surfaces 52, cut into the rotor. In this case, however, the rotor is spun by reaction jets instead of by impulse, as in Fig. 1. To this end, air from the channel 28' in the gyro casing is led through channel 56 in through the center of an axial pin 57, where it passes into an axial aperture O in the rotor 25'. Thence the air passes out radially through a plurality of bores 58, closed at their outer ends, whence it emerges tangentially through nozzles 59 adjacent the periphery of the rotor. It will readily be apparent that the rotor will be driven by reaction in the opposite direction from the air escaping from the nozzles.

The magnetic element, in this instance, is shown as a bar magnet 37' mounted in an aperture in small block 60 at one end of the gyro casing. Said block is freely supported about its vertical axis on air bearings formed, in this instance, by making the top and the bottom of the same concave and providing cooperating convex buttons 61 and 62 threaded in extensions from the case. Used air from the interior of the gyro casing passes through channels 64 to the interior of said buttons and thence downwardly through bore 65 to provide an air film between the buttons and the concave surfaces. A portion of the air also passes through a central bore 66 in said block and thence passes outwardly through a bore 67 in plug 67' leading to upwardly and downwardly directed nozzles 68 and 69. Said nozzles project opposite air streams which are normally bisected by knife edge baffles 70 and 71 secured to the rotor casing. Preferably said baffles are cup shaped on their under surfaces so as to secure an added reaction from the air. It will be readily apparent that the air jets will exert no torque on the gyroscope about its horizontal axis as long as the knife edges are symmetrically placed, but in case of relative movement about the vertical axis between the magnet and the gyroscope, unbalanced torques will be exerted about the horizontal axis in the proper direction to cause the gyroscope to slowly follow the magnet. The effective torque is mainly due to the reaction of the unintercepted jet on the gyro casing, acting through the upper and lower bearings of the magnetic element, as in Figs. 4 and 6. This torque may be increased by making the baffles cup shaped, as shown in Fig. 8, to direct the air from the intercepted jet backwardly. The rate of following may be readily adjusted by adjusting the velocity of air flow to the nozzles by means of a set screw 72, the end of which acts as a throttle valve within the passage 64.

It should be noted that in all forms of the invention the baffle plates, that is, the parts which intercept the air jets, are on the gyroscopic element while the jets themselves are carried by the magnetic element. I regard the mounting of the jets on the sensitive element as of importance, since the reaction of the jets on the sensitive element remains balanced regardless of the position of the baffle, and therefore there is no torque in azimuth exerted on the magnetic element regardless of the position of the baffle with respect thereto. In arrangements heretofore proposed, it has been customary to have the air jet or jets emerge from the gyro case and the baffle or cut-off disc carried by the magnetic element. In such an arrangement there is apt to be a torque exerted on the magnetic element of sufficient strength to cause the magnetic element to follow the gyro, so that the successful operation of the device is seriously impaired, if not destroyed.

At the opposite end of the gyro case quite a similar arrangement is provided for maintaining the gyroscope's spin axis level. As shown in Figs. 9 and 11, a short cylindrical block 60', corresponding to block 60, is provided with concave ends so as to be mounted for oscillation about a horizontal axis on the rounded buttons on the ends of end pieces 61' and 62'. Said block 60' is made pendulous about said horizontal axis by attaching a small mass 104 to the under surface thereof. See Figs. 11 and 14. In this instance the air from nozzles 68' and 69' emerges horizontally in opposite directions and is bisected by the curved baffles 70' and 71' secured to the gyro casing. Normally the reactions or impulses are balanced, but in case of relative inclination of the gyro casing with respect to the pendulous block 60', the air jets would be displaced, resulting in a greater torque about the vertical axis in one direction than in the other to eliminate the tilt of the gyroscope. Air is supplied to the nozzles 68' and 69' from the interior of the casing, as before, by means of the channel 64' which supplies air to furnish air bearings between the ends of the block 60' and the two buttons 61' and 62', some of which also passes into the cavity 105 and out through bore 67' to said nozzles.

In case it is desired to lock the gyroscope and reset the same, I have shown in Figs. 7 and 12 a caging device for this purpose. Slidably mounted on the bottom button 8' is a ring 90 having an annular channel therein engaged by oppositely extending pins 91 on a fork 92 pivoted at 93. On the opposite side of said pivot is a pin 94 secured to the fork, which is engaged by the flaring end 95 of a push button 96, so that when said button is pushed inwardly (in Fig. 7) the fork is rotated to raise the annulus 90. This engages and raises a lever 97 pivoted at 98, thereby bringing a roller 99 on the end thereof into contact with a surface 100 secured to the rotor bearing casing. Said surface is so shaped as to centralize the casing through a wide angle from both sides of the center. At the same time a crown or bevel gear 101 on the end 95 is brought into mesh with teeth 102 on the vertical ring 13' to set the gyroscope while locked.

If desired, a ball bank indicator 110 may be placed on the face 111 of the instrument (Fig. 7) adjacent the card 1' and both may be illuminated by lamp 112.

In all forms of the invention I preferably employ the same non-magnetic metal for all parts except, of course, the magnets themselves. An aluminum alloy is preferred for this purpose. By eliminating all magnetic metals in the construction of the gyroscope, the proper functioning of the magnets as a magnetic compass remains undisturbed, and by employing the same metal throughout, uniform operation under varying temperature conditions is assured by avoiding the troubles due to variation in temperature expansion coefficients of different metals. Also it should be noted that the air bearings have extra large bearing surfaces, so that a low unit pressure is secured. In addition, the cup of each of the air bearings preferably has substantially the same radius of curvature as the button, so that a minimum amount of air is required. The cup may also be lapped at its center a little to provide sufficient space for the incoming air and to retard the escape thereof through the tapering clearance nearer the periphery of the cup.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A gyro-magnetic compass comprising a gyroscope mounted for freedom about a vertical and a horizontal axis and for spinning about a second horizontal axis, and a magnetic element mounted on said gyroscope for freedom about the vertical axis, characterized by the use of a single source of air flow to provide free, air flotation spherical bearings about at least said vertical and first named horizontal axis of the gyroscope and the magnetic element, to spin the rotor, and to supply a source of power to coerce the gyroscope from said element, whereby the presence of stray magnetic fields due to the use of magnetic materials or electrical sources of power is avoided.

2. A gyro-magnetic compass comprising an outer casing, a vertical ring, upper and lower spherical bearings between said casing and ring, a rotor bearing frame, spherical bearings supporting said frame in said ring for movement about a horizontal axis, a rotor mounted in said frame on a horizontal axis normal to said first-mentioned horizontal axis on spherical bearings, all of said parts being of similar non-magnetic material, a magnetic element rotatably mounted on said frame on spherical bearings, and means for supplying air under pressure between the relatively movable parts of each of said bearings to support the parts carried thereby.

3. In a gyro-magnetic compass, the combination with a directional gyroscope including a rotor casing mounted for turning about a vertical axis and oscillation about a horizontal axis, a magnetic element mounted on said casing, and spaced spherical air bearings between said element and gyroscope and above and below said element, floating the former on the latter for independent freedom in azimuth only.

4. In a gyro-magnetic compass, the combination with a gyroscope, a magnetic element mounted thereon, air bearings between said element and gyroscope floating the former on the latter, and means responsive to relative turning of said element and gyroscope for controlling air jets to apply torques on the gyroscope to cause the same to maintain its normal predetermined position relative to said element, the reaction of a portion of the air after passing the bearings being used to apply said torque.

5. In a gyro-magnetic compass, a rotor, a rotor bearing frame, air bearings of non-magnetic material curved in more than one plane, mounting said rotor for spinning in said frame, a vertical ring, air bearings of non-magnetic material curved in more than one plane, mounting said frame in said ring for oscillation about a horizontal axis, a housing, air bearings of non-magnetic material curved in more than one plane, rotatably mounting said vertical ring in said housing, a magnetic element, air bearings of non-magnetic material curved in more than one plane, rotatably mounting said element on said frame, and air reaction means responsive to relative turning of said frame and element in azimuth for applying a torque to said gyroscope to cause the gyroscope to slowly follow the magnetic element.

6. In an air supported, directional gyroscope, the combination with the rotor bearing casing, a pendulous member, cooperating spherical air bearings pivoting said member on said casing, means for leading a flow of air between the surfaces of said bearings to support said member, opposed discharge nozzles in said member for directing some of said air laterally in opposite directions, and baffle members on said casing adapted to differentially intercept the air streams from said nozzles upon relative tilt of said casing and member to apply torque to said casing about a vertical axis.

7. In an air supported gyro-magnetic device, the combination with the rotor bearing casing, a magnetic element, cooperating spherical air bearings pivoting said element on said casing, means for leading a flow of air between the surfaces of said bearings to support said element, discharge nozzles in said element for directing air streams up and down, and baffle members on said casing adapted to differentially intercept the air streams from said nozzles upon relative displacement in azimuth of said casing and element and to apply torque to said casing about a horizontal axis.

8. In a magnetic compass, a magnetic element, upper and lower bearings for rotatably mounting the same including upper and lower spherical bearings, the centers of curvature of which are displaced vertically, whereby freedom about a vertical axis only is provided, and means whereby an air flow may be maintained between the two surfaces of each bearing to float said element between air films.

9. In a magnetic compass, a magnetic element, upper and lower bearings for rotatably mounting the same including upper and lower spherical bearings, means whereby an air flow may be maintained between the two surfaces of each bearing to float said element between air films, a follow-up support for said bearings, a baffle thereon and air jet means on said element cooperating with said baffle to cause said support to follow said element.

10. In a magnetic compass, a rotatable magnetic element subject to the earth's field, a support therefor, a cup in the support, a spherical end on said element of the same radius of curvature as said cup and adapted to rest in the cup, said cup having a central aperture therethrough, whereby upon air under pressure being supplied thereto, the element is floated on an air film without being rotated.

11. In a magnetic compass, a rotatable sensitive element subject to the earth's field, a support therefor, a cup in the support, a spherical end on said element of the same radius of curvature as said cup and adapted to rest in the cup, said cup having a central aperture therethrough, said cup being lapped out slightly near its center, whereby upon air under pressure being supplied thereto, the element is floated on an air film without being rotated.

12. A gyro-magnetic compass comprising an outer casing, a vertical ring therewithin, cooperating spherical air bearings of non-magnetic material between said casing and ring at top and bottom, journalling said ring for rotation about a vertical axis, a rotor bearing frame within said ring, cooperating spherical air bearings of non-magnetic material between said ring and casing at the two sides thereof journalling said casing for oscillation about a horizontal axis, a magnetic compass element, cooperating spherical air bearings of non-magnetic material pivotally mounting the same on said casing for freedom about at least a vertical axis, means for causing air flow between the cooperating surfaces of each bearing, and air means responsive to relative displacement of said gyroscope and element for causing the gyroscope to slowly follow said element.

13. A gyro-magnetic compass comprising an outer casing, a vertical ring therewithin, cooperating spherical air bearings of non-magnetic material between said casing and ring at top and bottom journalling said ring for rotation about a vertical axis, a rotor bearing frame within said ring, cooperating spherical air bearings of non-magnetic material between said ring and casing at the two sides thereof journalling said casing for oscillation about a horizontal axis, a magnetic compass element, cooperating spherical air bearings of non-magnetic material pivotally mounting the same on said casing for freedom about at least a vertical axis, means for causing air flow between the cooperating surfaces of each bearing, and air jet means responsive to relative displacement of said gyroscope and element for causing the gyroscope to slowly follow said element, air being supplied to said air jet means through said air passages.

14. A directional gyroscope comprising an outer casing, a vertical ring therewithin, spherical air bearings between said casing and ring at top and bottom journalling said ring for rotation about a vertical axis, a rotor bearing frame within said ring, spherical air bearings between said ring and casing at the two sides thereof journalling said casing for oscillation about a horizontal axis, a pendulous element pivotally mounted on said casing for freedom about a horizontal axis, and air means responsive to relative displacement of said gyroscope and element for maintaining the spin axis of said gyroscope horizontal.

15. A gyro-magnetic compass comprising an outer casing, a vertical ring therewithin, cooperating spherical air bearings of non-magnetic material between said casing and ring at top and bottom journalling said ring for rotation about a vertical axis, a rotor bearing frame within said ring, cooperating spherical air bearings of non-magnetic material between said ring and casing at the two sides thereof journalling said casing for oscillation about a horizontal axis, a magnetic compass element, cooperating spherical air bearings of non-magnetic material pivotally mounting the same on said casing for freedom about at least a vertical axis, a pendulous element pivotally mounted on said casing for oscillation about a horizontal axis, and air jet means for controlling the gyroscope in azimuth from said magnetic element and about its horizontal axis from said pendulous element.

16. In a gyro-magnetic compass, the combination with a directional gyroscope mounted for oscillation about a horizontal and turning about a vertical axis and a magnetic element pivotally mounted top and bottom thereon to one side of said horizontal axis, of differential air jet and baffle means for exerting a torque about the horizontal axis of the gyroscope upon relative deviation in azimuth of said gyroscope and element, in which the jet means is carried by the element and the baffle means by the gyroscope, so constructed and arranged that the reaction of the air stream from said jet means exerts a differential torque on said gyroscope about its horizontal axis responsive to the direction and amount of relative deviation in azimuth of said gyroscope and element.

17. In a gyro-magnetic compass, the combination with a directional gyroscope mounted for oscillation about a horizontal and turning about a vertical axis and a magnetic element pivotally mounted top and bottom thereon to one side of said horizontal axis, of an air jet means turnable with said element, baffle means on said gyroscope adapted to be differentially intercepted by the jets from said jet means, upon relative turning of said gyroscope and element in azimuth, so constructed and arranged that the air from said jets exerts a resultant torque on said gyroscope about its horizontal axis to cause the same to follow the magnetic element.

18. In a gyro-magnetic compass, the combination with a directional gyroscope and a magnetic element pivotally mounted thereon, a pair of diametrically opposed jets on said element, means for supplying air thereto, and baffle means on said gyroscope so constructed and arranged as to be intercepted differentially by said jets upon relative turning of the element and gyroscope in azimuth and to exert thereby a torque about the horizontal axis of the gyroscope to cause it to slowly follow the element in azimuth.

19. A magnetic compass as claimed in claim 9, wherein said air jet means comprises a pair of diametrically opposite ports, said air flow means for said bearings also supplying air to said jets.

20. In a gyro-magnetic compass, the combination with a directional gyroscope and a magnetic compass element, bearing means rotatably mounting the latter on the former, including spaced spherical bearings, means whereby air flow is maintained during operation between the two surfaces of each bearing to float said element between said films, and differential air jet and baffle means on said gyroscope and element to cause said gyroscope to follow said element in azimuth.

21. In an air supported directional gyroscope, the combination with the rotor bearing casing, a pendulous member, a bearing having an aperture therethrough pivoting said member on said casing, opposed discharge nozzles in said member for directing air from said aperture laterally in opposite directions, and baffle members on said casing adapted to differentially intercept the air streams from said nozzles upon relative tilt of said casing and member to apply torque to said casing about a vertical axis.

22. In a magnetic compass, a magnetic element, spaced bearings for rotatably mounting the same, means for leading air under pressure into said element through at least one of said bearings, a follow-up support for said bearings, baffle means on said support on opposite sides of said element, and a pair of diametrically opposite jets supplied from said pressure means and adapted to have the air streams therefrom differentially intercepted upon relative turning of said element and support to cause said support to follow said element.

LESLIE F. CARTER.